United States Patent [19]

Nagata et al.

[11] Patent Number: 5,671,254

[45] Date of Patent: Sep. 23, 1997

[54] MODULATION, DEMODULATION AND ANTENNA COUPLING CIRCUITS USED IN IC CARD READING/WRITING APPARATUS, AND METHOD OF SUPPLYING POWER TO THE IC CARD

[75] Inventors: Yoshishige Nagata; Kenichi Takahira, both of Hyogo, Japan

[73] Assignee: Mitsubishi Denki Kabushiki Kaisha, Tokyo, Japan

[21] Appl. No.: 449,546

[22] Filed: May 24, 1995

[30]  Foreign Application Priority Data

Dec. 22, 1994 [JP] Japan ................................ 6-320769

[51] Int. Cl.$^6$ ............................ H04L 27/14; H04L 27/16; H04L 27/22
[52] U.S. Cl. ............................ 375/326; 375/364; 329/309
[58] Field of Search .................................. 375/308, 362, 375/364, 354, 371, 326, 340, 327, 329; 329/306–309

[56]  References Cited

U.S. PATENT DOCUMENTS

| 4,311,964 | 1/1982 | Boykin . |
| 4,724,427 | 2/1988 | Carroll . |
| 4,744,094 | 5/1988 | McCarren . |
| 5,218,343 | 6/1993 | Stobbe et al. . |

FOREIGN PATENT DOCUMENTS

| 0301127 | 2/1989 | European Pat. Off. . |
| 0525642 | 2/1993 | European Pat. Off. . |
| 0589046 | 3/1994 | European Pat. Off. . |
| 0596521 | 5/1994 | European Pat. Off. . |
| 2330217 | 5/1977 | France . |
| 312362 | 2/1991 | Japan . |
| 312353 | 2/1991 | Japan . |
| 319591 | 3/1991 | Japan . |
| 325832 | 4/1991 | Japan . |
| 53164 | 1/1993 | Japan . |
| 520798 | 3/1993 | Japan . |
| 561596 | 9/1993 | Japan . |
| 585065 | 12/1993 | Japan . |

*Primary Examiner*—Tesfaldet Bocure
*Assistant Examiner*—Bryan Webster
*Attorney, Agent, or Firm*—Rothwell, Figg, Ernst & Kurz

[57] ABSTRACT

A modulator used in an IC card reader/writer includes a phase variation detector for detecting a varying point of the phase of a modulated signal, a signal processing circuit for modifying the modulated signal for a half period at the phase varying point to have a frequency and amplitude twice those of the modulated signal, a first Miller integrator for integrating the modified signal to produce a triangular wave signal, and a second Miller integrator for integrating the triangular wave signal to produce a sinusoidal wave signal having a continuous phase. A demodulator used in the reader/writer includes a sync control circuit which controls a carrier sync signal generation circuit thereby to control the phase of a carrier sync signal in response to the discrimination as to whether the carrier sync signal is in lead-phase or lag-phase relative to the signal modulated based on binary phase shift keying (BPSK). A control data signal and non-modulated carrier wave sent from the reader/writer to the IC card are converted into power for use by the IC card.

2 Claims, 12 Drawing Sheets

FIG. 4B SDD

| | INPUT SIGNAL (LIMITER OUTPUT) | COUNTERS | CARRIER SYNC COUNTER (CSC) | | SYNC CONTROL DISCRIMINANT CONDITION |
|---|---|---|---|---|---|
| | | | FORMER HALF 0 1 2 3 | LATTER HALF 4 5 6 7 | |
| IN-PHASE | COMMON PHASE | SGC | 7 6 5 4 | 3 2 1 0 | MDT |
| | | SCC | 7 6 5 4 | 5 6 7 0 | EQL, (CMP) |
| | OPPOSITE PHASE | SGC | 1 2 3 4 | 5 6 7 0 | MDT |
| | | SCC | 1 2 3 4 | 3 2 1 0 | EQL, (CMP) |
| LAG 1 | | SGC | 1 0 7 6 | 5 4 3 2 | MDT |
| | | SCC | 1 0 7 6 | 7 0 1 2 | EQL, CMP |
| | | SGC | 7 0 1 2 | 3 4 5 6 | MDT |
| | | SCC | 7 0 1 2 | 1 0 7 6 | EQL, CMP |
| LAG 2 | | SGC | 1 2 1 0 | 7 6 5 4 | MDT |
| | | SCC | 1 2 1 0 | 1 2 3 4 | EQL, CMP |
| | | SGC | 7 6 7 0 | 1 2 3 4 | MDT |
| | | SCC | 7 6 7 0 | 7 6 5 4 | EQL, CMP |
| LAG 3 | | SGC | 1 2 3 2 | 1 0 7 6 | MDT |
| | | SCC | 1 2 3 2 | 3 4 5 6 | EQL, CMP |
| | | SGC | 7 6 5 6 | 7 0 1 2 | MDT |
| | | SCC | 7 6 5 6 | 5 4 3 2 | EQL, CMP |
| LEAD 1 | | SGC | 7 6 5 4 | 3 2 1 2 | MDT |
| | | SCC | 7 6 5 4 | 5 6 7 6 | EQL, CMP |
| | | SGC | 1 2 3 4 | 5 6 7 6 | MDT |
| | | SCC | 1 2 3 4 | 3 2 1 2 | EQL, CMP |
| LEAD 2 | | SGC | 7 6 5 4 | 3 2 1 2 | MDT |
| | | SCC | 7 6 5 4 | 5 6 7 6 | EQL, CMP |
| | | SGC | 1 2 3 4 | 5 6 5 4 | MDT |
| | | SCC | 1 2 3 4 | 3 2 3 4 | EQL, CMP |
| LEAD 3 | | SGC | 7 6 5 4 | 3 4 5 6 | MDT |
| | | SCC | 7 6 5 4 | 5 4 3 2 | EQL, CMP |
| | | SGC | 1 2 3 4 | 5 4 3 2 | MDT |
| | | SCC | 1 2 3 4 | 3 4 5 6 | EQL, CMP |

MODULATION, DEMODULATION AND
ANTENNA COUPLING CIRCUITS USED IN
IC CARD READING/WRITING APPARATUS,
AND METHOD OF SUPPLYING POWER TO
THE IC CARD

BACKGROUND OF THE INVENTION

1. Field of the Invention

The present invention relates to a non-contact IC (Integrated Circuit) card communication system, and particularly to a modulation, demodulation and an antenna coupling circuit used in a non-contact IC card reader/writer and to a method of supplying power to the IC card while transferring data.

2. Description of the Related Art

Figure 14:
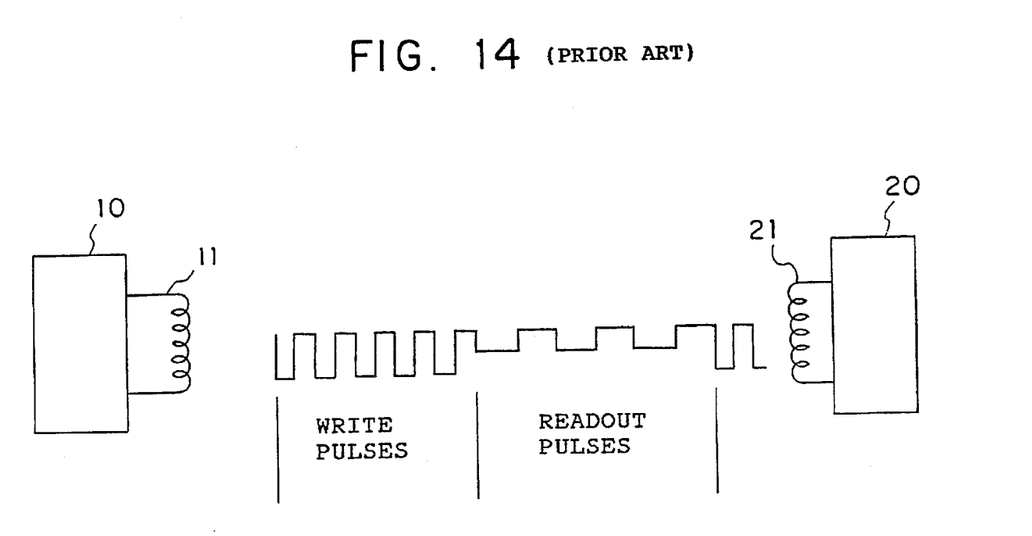
FIG. 14 is a diagram showing the conventional IC card communication system.

FIG. 14 shows the arrangement of the conventional IC card communication system described in Japanese Patent Publication No. 5-20798. In the figure, reference numeral 10 denotes an IC card of non-contact type, and 11 is a loop antenna for data transmission and reception, provided in the IC card 10. Indicated by 20 is a reader/writer for writing and reading out data to/from the IC card 10, and 21 is a loop antenna provided on the reader/writer 20.

Data is written to or read out of the IC card 10 based on the transmission of pulse signals between the loop antenna 11 of the IC card 10 and the loop antenna 21 of the reader/writer 20 as shown in the FIG. 14. The IC card 10 is supplied with power in the energy form of electromagnetic wave emitted by the reader/writer 20.

However, the transmission of such pulse signals in the space causes spurious sidebands to emerge and also increases artificial noises. In the spatial transmission path having frequency characteristics with delay, it is difficult to carry out the high-rate data transfer with high reliability. The power supply to the IC card 10 based on the transmission of a pulse signal is not efficient due to the spreading of the frequency spectrum.

SUMMARY OF THE INVENTION

As described above, there were drawbacks in that the transmission of such pulse signals in the space causes spurious sidebands to emerge and also increases artificial noises, in the spatial transmission path having frequency characteristics with delay, it is difficult to carry out the high-rate data transfer with high reliability and the power supply to the IC card 10 based on the transmission of a pulse signal is not efficient due to the spreading of the frequency spectrum.

The present invention is intended to overcome the foregoing prior art deficiencies, and its prime object is to provide a modulation, demodulation and antenna coupling circuits for an IC card reader/writer capable of implementing the high-rate data transfer with high reliability and supplying power to the IC card efficiently, and to provide a method supplying power to an IC card.

In order to achieve the above objective, the modulation circuit of the IC card reader/writer based on this invention comprises a differential encoder for rendering the differential encoding for a signal to be sent to the IC card, a modulator for implementing the binary phase shift keying (BPSK) modulation based on the exclusive logical sum operation for the encoded signal and a pulse signal having a carrier frequency, a phase change detector for detecting a change point of the phase of the modulated signal, a signal processing circuit for modifying the modulated signal for a half cycle at the phase change point to have a frequency and amplitude twice those of the modulated signal, a first Miller integration circuit which integrates the modified signal to produce a triangular wave signal, and a second Miller integration circuit which further integrates the resulting triangular wave signal to produce a sinusoidal wave signal having a continuous phase.

In operation, the modulator implements the BPSK modulation for a signal to be transmitted. Subsequently, the phase change point detector detects a change point in phase of the modulated signal. The signal processing circuit modifies the modulated signal for a half cycle at the phase change point to have a frequency and amplitude twice those of the modulated signal. The first Miller integration circuit integrates the modified signal to produce a triangular wave signal. The second Miller integration circuit further integrates the triangular wave signal to produce a sinusoidal wave signal having a continuous phase, and the resulting signal is led out of the modulation circuit.

Accordingly, based on the use of the second Miller integration circuit for forming a sinusoidal wave signal having a continuous phase, the creation of spurious sidebands is suppressed, the signal is modulated efficiently for high-rate transfer, and the control data signal is prevented from band spreading so that it is converted into power efficiently.

The signal processing circuit in the modulation circuit of the IC card reader/writer based on this invention includes an additive pulse generator which generates a 1-cycle pulse signal having a frequency twice the carrier frequency at the phase change point, an inverting circuit for inverting the modulated signal, a first logical sum circuit having inputs of the modulated signal and the pulse signal provided by the additive pulse generator, a second logical sum circuit having inputs of an inverted modulated signal provided by the inverting circuit and the pulse signal provided by the additive pulse generator, and a voltage summing means for summing the output voltages of the first and second logical sum circuits.

In operation, the additive pulse generator generates a 1-cycle pulse signal having a frequency twice the carrier frequency at the phase change point. The modulated signal is inverted by the inverting circuit. The first logical sum circuit takes the logical sum of the modulated signal and the pulse signal provided by the additive pulse generator, and the second logical sum circuit takes the logical sum of the inverted modulated signal provided by the inverting circuit and the pulse signal provided by the additive pulse generator. The voltage summing means sums the output voltages of the first and second logical sum circuits. Consequently, a reliable and inexpensive modulation circuit in a relatively simple circuit arrangement is accomplished.

The voltage summing means in the modulation circuit of the IC card reader/writer based on this invention includes a first resistor with its one end connected to the output of the first logical sum circuit and another end connected to the inverting input terminal of an operational amplifier in the first Miller integration circuit, and a second resistor with its one end connected to the output of the second logical sum circuit and another end connected to the inverting input terminal of the operational amplifier. The first and second resistors have their resistance values set to be 1:3 ratio are designed to serve for the input resistors of the first Miller integration circuit. This scheme contributes to the inexpensive modulation circuit.

The demodulation circuit of the IC card reader/writer based on this invention includes a carrier synchronizer and a bit synchronizer. The carrier synchronizer includes a carrier sync signal generation circuit for generating a carrier sync signal, an exclusive logical sum circuit having inputs of a BPSK-modulated signal (will be termed simply "BPSK signal" hereinafter) sent from an IC card and the carrier sync signal provided by the carrier sync signal generation circuit, a sync gate counter which up-counts or down-counts clock pulses of the reader/writer depending on the output signal of the exclusive logical sum circuit, a majority discriminator which determines, while the sync gate counter performs a count operation during a half cycle of the carrier sync signal, the majority level of the BPSK signal thereby to detect as to whether the carrier sync signal and the BPSK signal are in common phase or opposite phase, a former/latter halves comparator which compares the duration of the BPSK signal between the former half and latter half of a half period of the carrier sync signal, and a sync control circuit which controls the carrier sync signal generation circuit thereby to control the phase of the carrier sync signal in response to the detection as to whether the carrier sync signal is in lead-phase or lag-phase relative to the BPSK signal based on the detection result of the majority discriminator and the comparison result of the former/latter halves comparator. In operation, in the carrier synchronizer, the carrier sync signal generation circuit generates a carrier sync signal. The exclusive logical sum circuit receives the BPSK signal sent from an IC card and the carrier sync signal provided by the carrier sync signal generation circuit, and takes the exclusive logical sum of these input signals. The sync gate counter counts clock pulses of the reader/writer during a half period of the carrier sync signal by being controlled for its count mode (up/down) by the output signal of the exclusive logical sum circuit. The majority discriminator determines the majority level of the BPSK signal thereby to detect as to whether the carrier sync signal and the signal resulting from BPSK modulation are in common phase or opposite phase. The former/latter halves comparator compares the duration of the BPSK pulse signal between the former half and latter half of a half period of the carrier sync signal. Based on the detection results of the majority discriminator and former/latter halves comparator, the sync control circuit detects the lead-phase or lag-phase of the carrier sync signal relative to the BPSK signal and controls the carrier sync signal generation circuit thereby to control the phase of the carrier sync signal. Consequently, the demodulation circuit implements the accurate demodulation for high-rate data transmission.

The bit synchronizer in the demodulation circuit of the IC card reader/writer based on this invention receives the output signal of the majority discriminator in the carrier synchronizer and the carrier sync signal, and delivers demodulated data based on a majority discrimination and a bit-synchronous reception timing signal. Accordingly, majority-based data demodulation is made possible and bit synchronization is controlled for the enhanced accuracy of demodulation.

The antenna coupling circuit of the IC card reader/writer based on this invention includes a coupling transformer having an antenna coil connected to an loop antenna, a receiving coil, and a transmitting coil connected to the transmitter section, an operational amplifier with its one input terminal connected to the receiving coil of the coupling transformer and its output terminal connected to the receiver section, and resistors which divide the transmitter output voltage and delivers the divided voltage to another input terminal of the operational amplifier. The divided voltage has such an amplitude as to offset on the operational amplifier the transmitter output voltage induced on the receiving coil. Accordingly, the antenna coupling circuit enables the concurrent transmission and reception.

Another antenna coupling circuit of the IC card reader/writer based on this invention includes a coupling transformer having an antenna coil connected to the loop antenna and transmitting/receiving coil connected to the transmitter section, an operational amplifier with its one input terminal connected to the transmitting receiving coil of the coupling transformer and its output terminal connected to the receiver section, and resistors which divide the transmitter output voltage and supply the divided voltage to another input terminal of the operational amplifier. The divided voltage has such an amplitude as to offset by the operational amplifier the transmitter output voltage induced on the transmitting/receiving coil. Accordingly, the antenna coupling circuit enables the concurrent transmission and reception, and it is compact and inexpensive by sharing one coil for transmission and reception.

The method of supplying power to an IC card based on this invention comprises a step of sending a control data signal from the reader/writer to the IC card, a subsequent step of sending a non-modulated carrier wave for power supply from the reader/writer to the IC card, a step of receiving by the IC card the control data signal and non-modulated carrier wave and converting the data signal and carrier wave into power continuously, and a step of sending a data signal from the IC card to the reader/writer during the reception of the non-modulated carrier wave. Accordingly, the IC card is supplied with power continuously, and it implements the efficient signal-power conversion.

Another method of power supply to an IC card based on this invention comprises a first step of sending a control data signal from the reader/writer to the IC card, a second step of receiving by the IC card the control data signal and converting the data signal into power, a third step of sending a data signal from the IC card to the reader/writer, a fourth step of sending a non-modulated carrier wave for power supply from the reader/writer to the IC card, a fifth step of receiving by the IC card the modulated data signal and non-modulated carrier wave and converting the data signal and carrier wave into power, a sixth step of sending a data signal from the IC card to the reader/writer, and a seventh step of repeating the fourth step and sixth step. Accordingly, the IC card is supplied with power intermittently, and it implements the efficient signal-power conversion during the cyclic reception of the non-modulated carrier wave.

DESCRIPTION OF THE PREFERRED EMBODIMENTS

Embodiment 1

An embodiment of this invention will be explained in detail with reference to the drawings.

Figure 1:
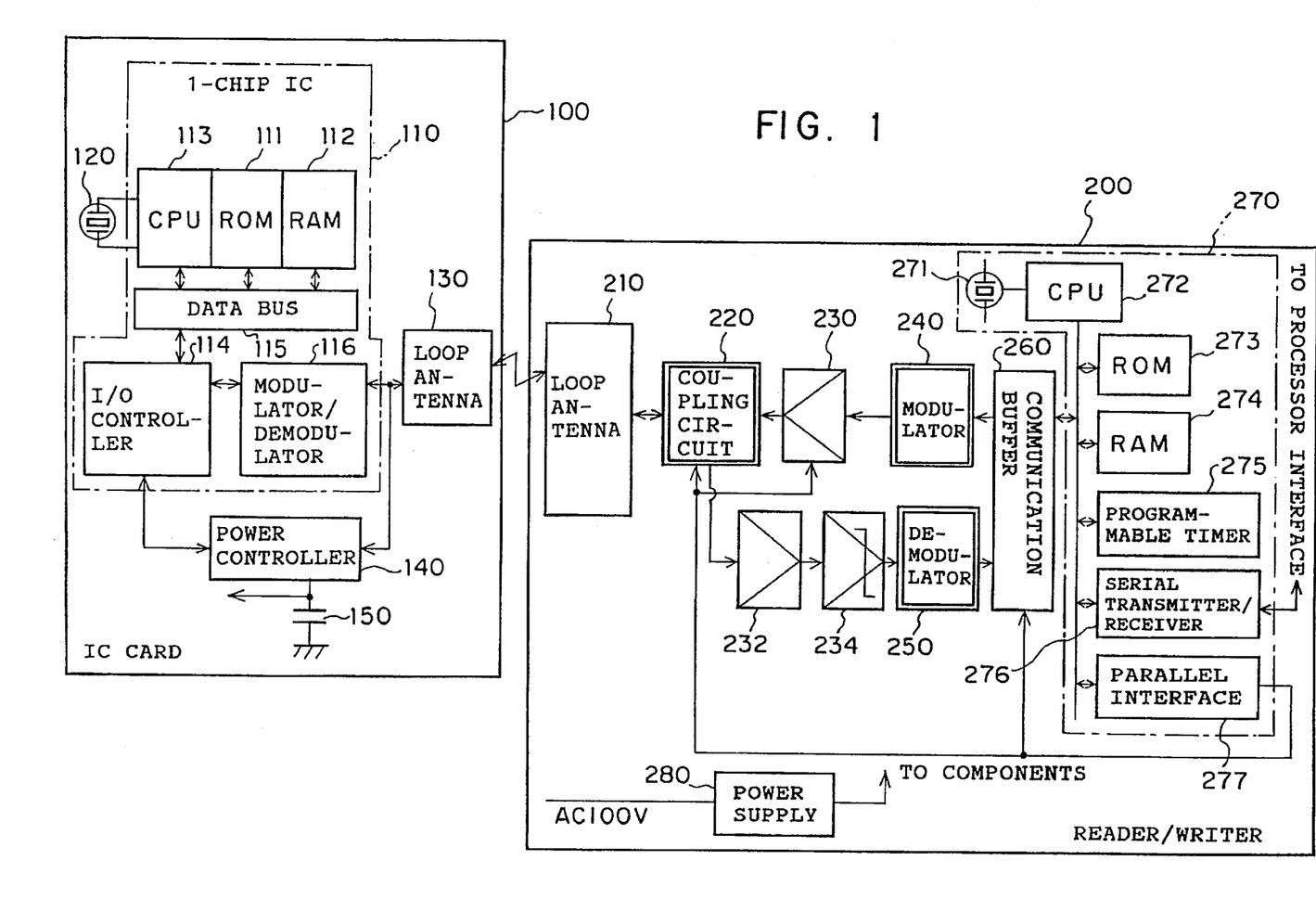
FIG. 1 is a block diagram showing the IC card communication system using the modulation, demodulation and antenna coupling circuits based on the first embodiment of this invention.

FIG. 1 shows the IC card communication system using the inventive modulation, demodulation and an antenna coupling circuit. In the figure, reference numeral 100 denotes an IC card of non-contact type, and it includes a 1-chip integrated circuit (IC) 110, in which are formed a ROM 111 which stores programs and data, a RAM 112 which stores as a temporary data, serving as a working area, a CPU 113 which runs the programs, an input/output controller 114, a data bus 115, and a modulator/demodulator 116.

The IC card 100 further includes a crystal oscillation circuit 120 which supplies a clock signal to the IC 110, a loop antenna 130 which radiates and receives electromagnetic waves, a power controller 140 which produces power for the IC 110 from the received electromagnetic wave, and a power storing capacitor 150.

Indicated by 200 is a reader/writer which writes and reads data to/from the IC card 100, and it includes a loop antenna 210 which radiates and receives electromagnetic waves, a coupling circuit 220 which couples the loop antenna 210 with the transmitter and receiver sections of the reader/writer 200, and a communication buffer 260 which stores communication data temporarily. The output signal of the communication buffer 260 is modulated based on Binary Phase Shift Keying (BPSK) modulation by a modulation circuit 240, amplified by an output amplifier 230, and delivered to the coupling circuit 220.

A received signal outputted from the coupling circuit 220 is amplified by a receiving amplifier 232, converted into a rectangular wave signal with a certain amplitude by a limiter 234, demodulated by a demodulation circuit 250, and fed to the communication buffer 260.

The reader/writer 200 further includes a microcomputer board 270, on which are packaged a crystal oscillation circuit 271 which generates a reference clock signal, a ROM 273 which stores programs and data, a CPU 272 which runs the programs, a RAM 274 which stores temporary data serving as a working area, a programmable timer 275, a serial transmitter/receiver 276 for communicating with an external device through a cable, and a parallel interface 277. Indicated by 280 is a power supply which produces a d.c. power voltage from the a.c. power line voltage and supplies the d.c. power voltage to the components of the reader/writer 200.

Figure 2:
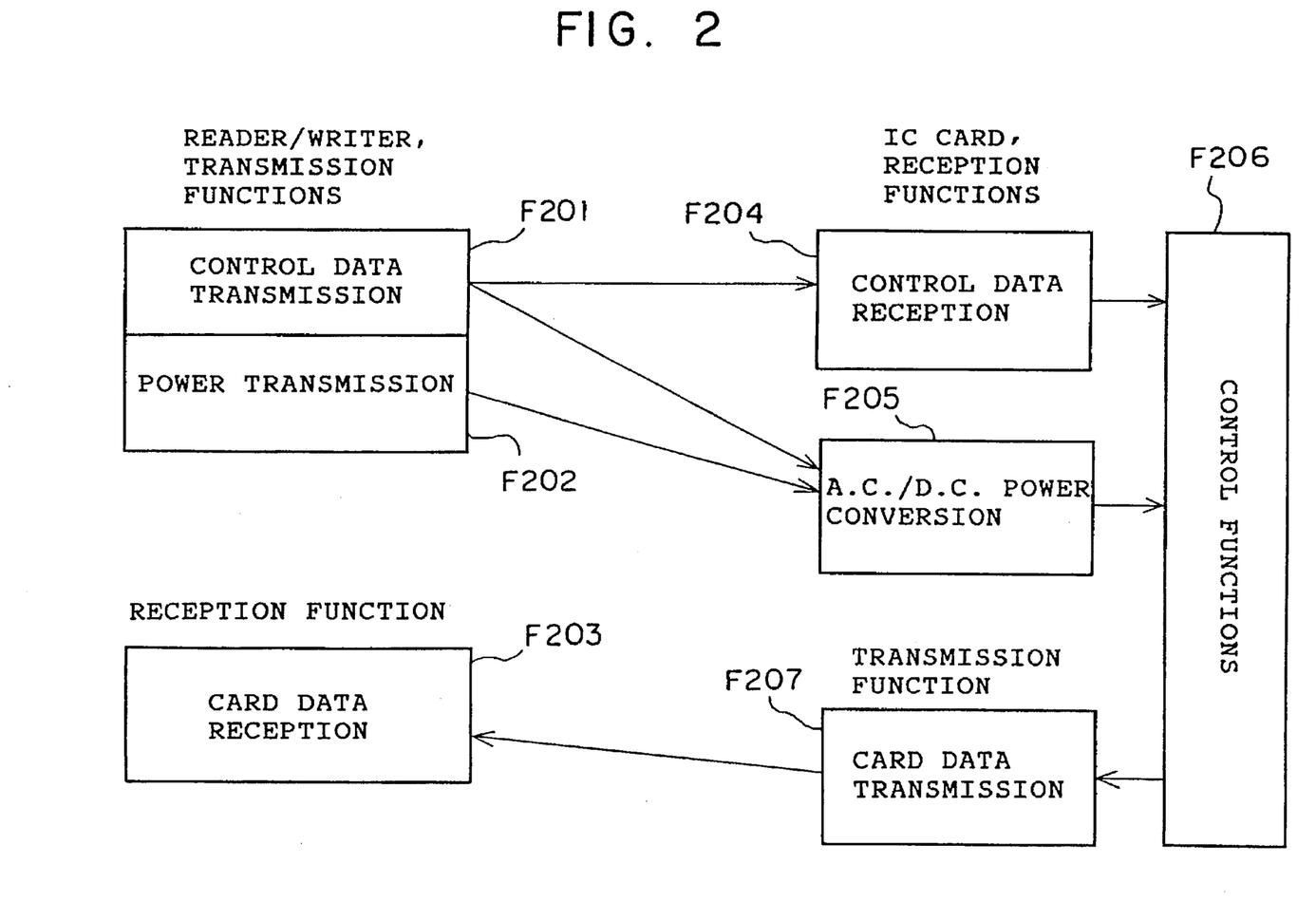
FIG. 2 is a systematic diagram showing the functions of the IC card communication system shown in FIG. 1.

FIG. 2 shows the functions of the IC card communication system shown in FIG. 1. The reader/writer 200 has two major functions of transmission and reception. The transmission function includes a control data transmitting function F201 and a power transmitting function F202, and the reception function is a card data receiving function F203 from the IC card.

The IC card has a control data receiving function F204 in connection with the control data transmitting function F201 of the reader/writer 200, and an a.c./d.c. voltage converting function F205 in connection with the control data transmitting function F201 and power transmitting function F202. The voltage converting function F205 converts the received electromagnetic wave into a d.c. voltage to be supplied as power to the IC 110 of the IC card. The IC card further has a control function F206 for controlling the data read/write operations in accordance with the received control data during a period when power is being supplied to the IC card or when power is retained within the IC card and a card data transmitting function F207 for transmitting data stored in the IC card to the reader/writer 200 during the readout operation.

Figure 3:
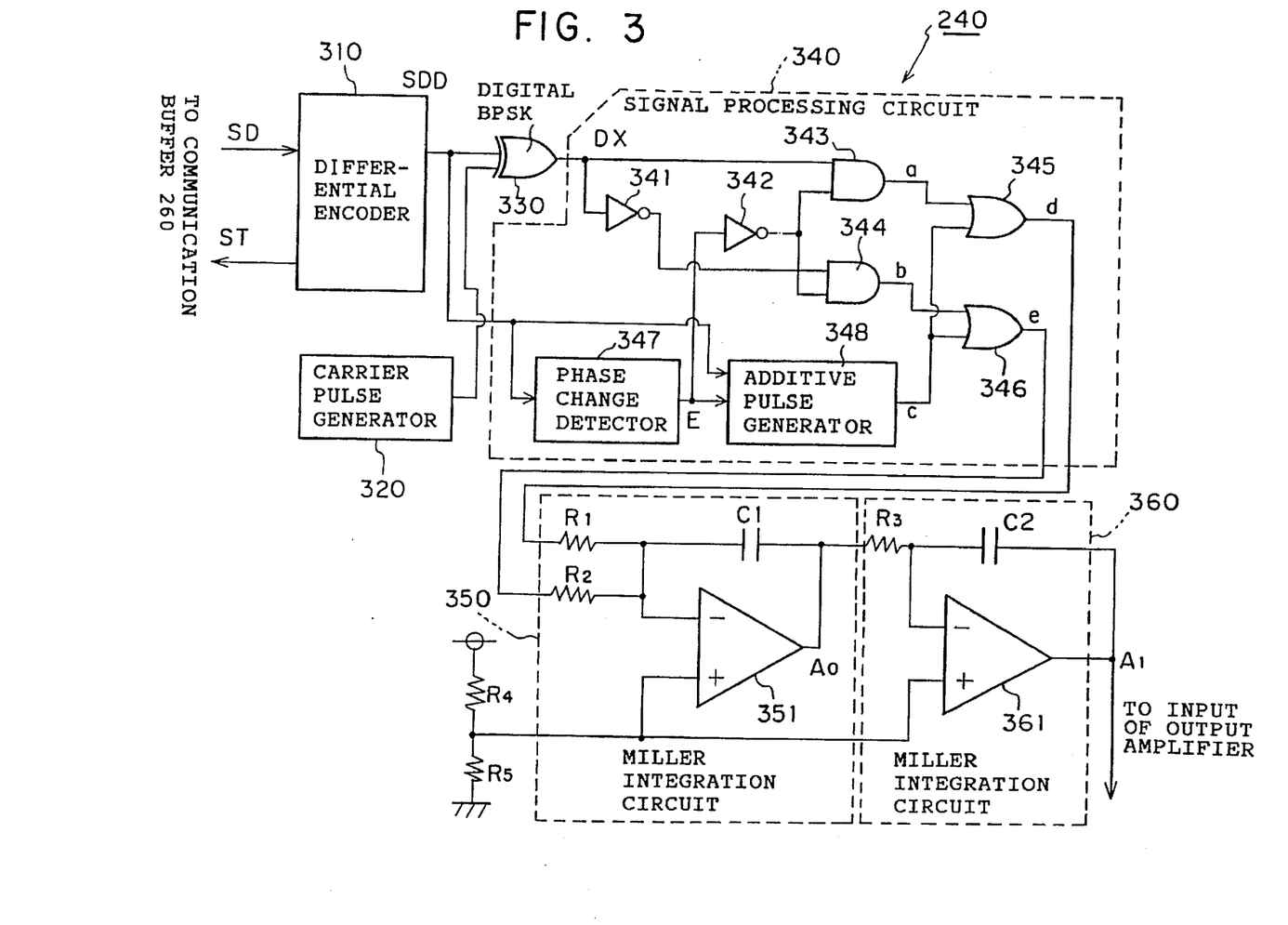
FIG. 3 is a schematic diagram of the modulation circuit shown in FIG. 1.
Figure 4A:
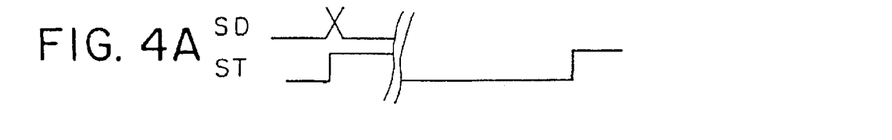
FIG. 4 is a waveform diagram showing the signals at various portions of the modulation circuit shown in FIG. 3.
Figures 4B, 4C:
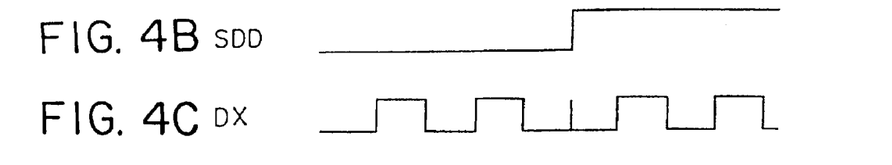
Figure 4D:
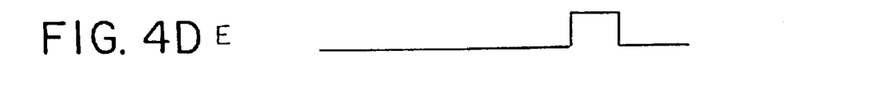
Figure 4E:
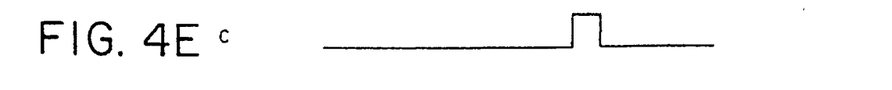
Figure 4F:
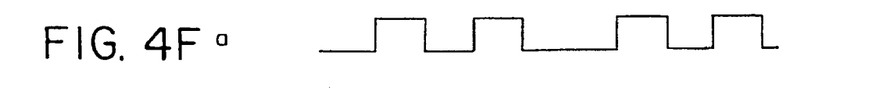
Figure 4G:
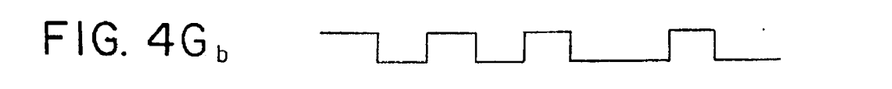
Figure 4H:
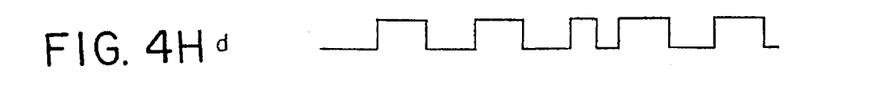
Figure 4I:
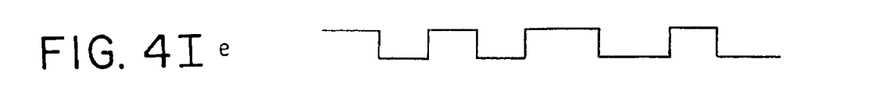
Figure 4J:
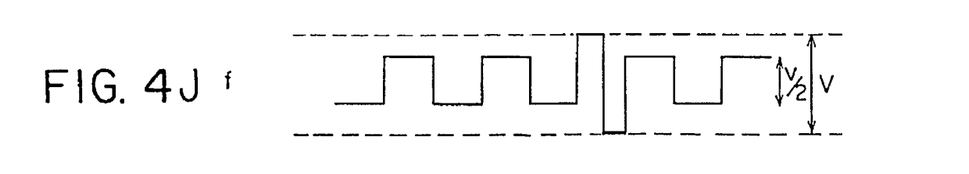
Figure 4K:
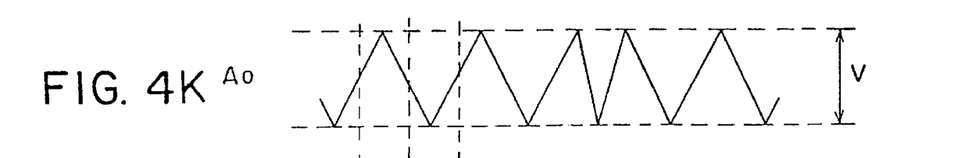
Figure 4L:
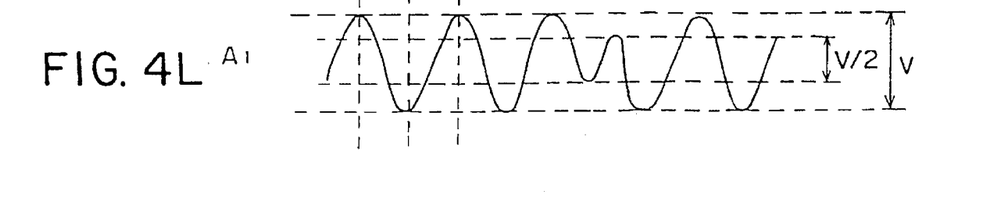

FIG. 3 shows a specific circuit diagram of the modulation circuit 240 of the reader/writer shown in FIG. 1. The modulation circuit 240 includes a differential encoder 310 which implements the differential encoding for data outputted from the communication buffer 260, a carrier pulse generator 320 which generates a carrier pulse signal used to convert the encoded signal into a BPSK-modulated signal, an exclusive-OR gate 330 which provides a digital BPSK signal, a digital signal processing circuit 340 for converting binary signals, which has a phase change detector 347 for detecting a phase change in the output signal of the differential encoder 310 and an additive pulse generator 348 for generating an additive pulse in response to the detection of a phase change, and Miller integration circuits 350 and 360 which have operational amplifiers 351 and 361, respectively. The digital signal processing circuit 340 includes, in its output stage, OR gates 345 and 346 with their outputs fed through resistors R1 and R2 to the inverting input of the operational amplifier 351. The resistors R1 and R2 have resistance values where the ratio of these values are 1:3.

Next, the operation of the modulation circuit FIG. 3 will be explained with reference to the waveform diagram of FIG. 4. When the differential encoder 310 issues a bit sync signal ST to the communication buffer 260, it returns transmission data SD to the encoder 310. The differential encoder 310 converts the data SD into a signal which varies in phase to represent the value of the data SD. Specifically, the differential encoder 310 switches its output SDD from "0" to "1" or from "1" to "0" in synchronism to the bit sync signal ST if the data SD is "0", and it keeps the output SDD unchanged if the data SD is "1". The output SDD of the differential encoder 310 and a pulse train at the constant carrier frequency provided by the carrier pulse generator are fed to the exclusive-OR gate 330, which then produces a digital BPSK signal DX as a result of the exclusive logical sum operation.

When the phase variation detector 347 detects a phase change in the signal SDD, it outputs a pulse signal E during a half cycle of the carrier wave. Responsive to the pulse signal E, the additive pulse generator 348 produces a 1-cycle pulse c with a frequency twice the carrier frequency at a timing depending on the polarity of the signal SDD. Specifically, the pulse c is produced in the former half cycle or latter half cycle in response to whether the signal SDD is "1" or "0", respectively.

The AND gate 343 has inputs of the BPSK signal DX and an inverted signal, provided by the inverter 342, of the output signal E of the phase change detector 347. Accordingly, the AND gate 343 outputs the signal DX when the signal E is "0" and the signal DX is positive, thereby producing a pulse signal a. Another AND gate 344 has inputs of an inverted BPSK signal DX provided by the inverter 341 and an inverted signal, provided by the inverter 342, of the output signal E of the phase change detector 347. Accordingly, the AND gate 344 outputs the inverted signal of the signal DX when the signal E is "0" and the inverted signal DX is positive, thereby producing a pulse signal b. The OR gate 345 has inputs of the signals a and c to produce a pulse signal d, and another OR gate 346 has inputs of the signals b and c to produce a pulse signal e. Accordingly, the signal d represents the BPSK signal DX or the pulse signal c when the signal E is "0" or "1", respectively, and the signal e represents the inverted signal of the BPSK signal DX or the pulse signal c when the signal E is "0" or "1", respectively.

The OR gates 345 and 346 have their output signals d and e summed in terms of the voltage value by being fed through the resistors R1 and R2, resulting in a voltage signal f shown in FIG. 4. Since the resistors R1 and R2 have a 1:3 resistance ratio as, the result of voltage summation, a voltage pulse signal f with an amplitude of ½ V (¾¼=½) is outputted when the signal E is "0". On the other hand, a voltage pulse signal f with a frequency twice the signal DX and the amplitude of 1 V (¾+¼=1) is outputted when the signal E is "1".

The Miller integration circuit 350 having the input resistors R1 and R2 integrates the signal f to produce a triangular wave signal A0. Namely, the resistors R1 and R2 are used for the proportional summation of the signals d and e, and also for the input resistors of the Miller integration circuit 350. The Miller integration circuit 360 further integrates the output signal of the integration circuit 350 to produce a sinusoidal wave signal A1. The resulting signal A1 has the amplitude of 1 when the signal E is "0", or has an amplitude of ½ and 2-fold frequency when the signal E is "1". Consequently, the modulation circuit 240 by a simple digital-analog combined circuit arrangement may produce a BPSK signal having a sinusoidal waveform of continuous phase.

Embodiment 2

Figure 5:
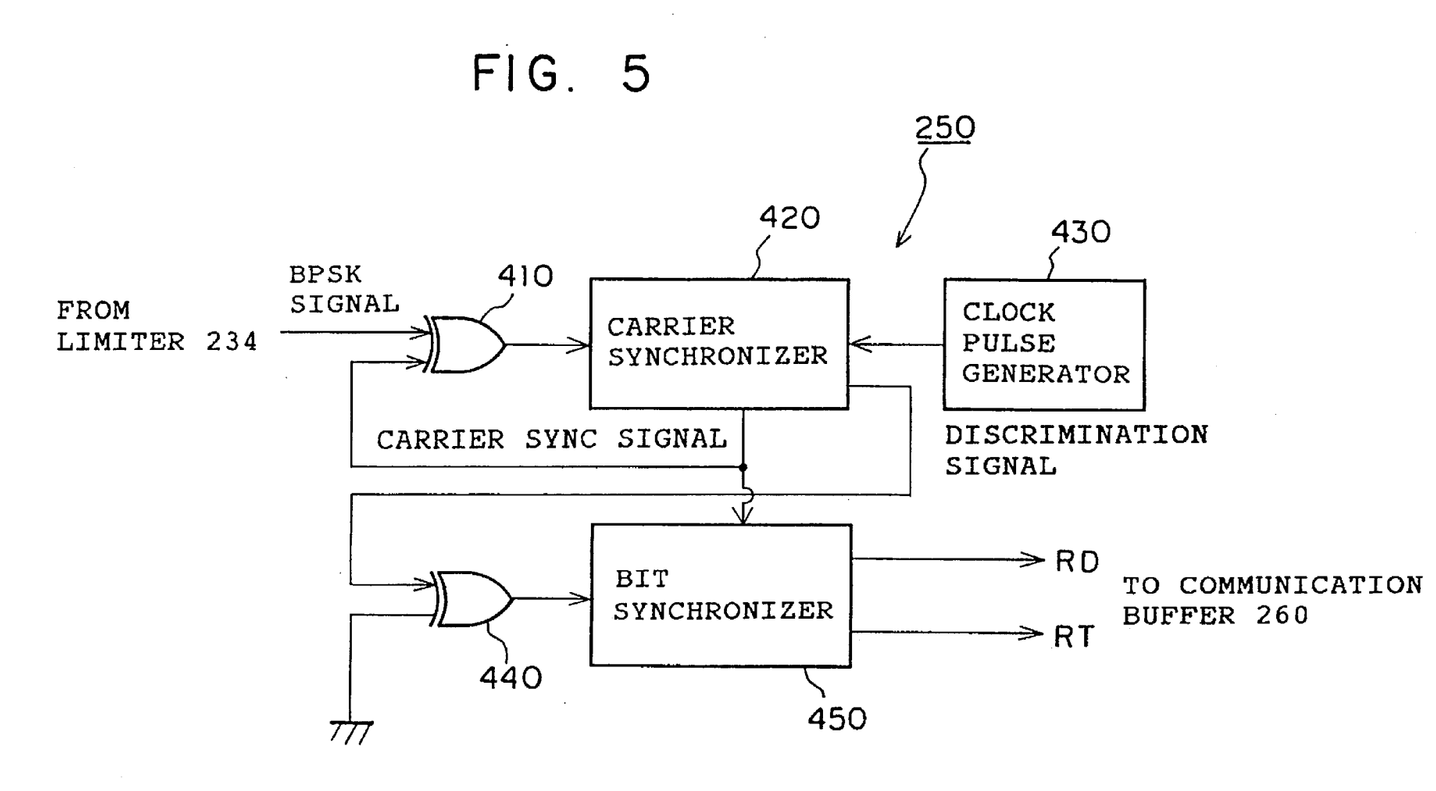
FIG. 5 is a schematic diagram of the demodulation circuit based on the second embodiment of this invention.

FIG. 5 shows the basic arrangement of the demodulation circuit based on the second embodiment of this invention. This circuit is used as the demodulation circuit 250 in the IC card reader/writer 200 of the preceding first embodiment shown in FIG. 1. Since the configuration and the operation of the IC card communication system of FIG. 1 have already been explained in the first embodiment, duplicate explanation is omitted in this embodiment.

As shown in FIG. 5, the demodulation circuit 250 comprises exclusive-OR gates 410 and 440, a carrier synchronizer 420, a clock pulse generator 430, and a bit synchronizer 450. The carrier synchronizer 420 and exclusive-OR gate 410 operate to discriminate the input BPSK signal to be in common phase or in opposite phase. Specifically, the exclusive-OR gate 410 has inputs of the BPSK signal from the limiter 234 and the carrier sync signal produced within the carrier synchronizer 420. The carrier synchronizer 420 processes the output of the exclusive-OR gate 410 to discriminate the input BPSK signal to be in common phase or in opposite phase based on majority discrimination, and produces a discrimination signal. These circuits further operate to discriminate whether the phase of input signal leads or lags with respect to the produced carrier sync signal, and implements the sync control by advancing or delaying the phase of the carrier sync signal accordingly.

The bit synchronizer 450 operates to implement the bit synchronization based on the arrangement and operation similar to the carrier synchronizer 420. In this case, the discrimination signal produced by the carrier synchronizer 420 is used in place of the BPSK signal, carrier sync signal is used in place of the clock pulse. The bit synchronizer 450 produces reception bit data RD and reception bit timing signal RT in place of the discrimination signal and carrier sync signal, respectively. The reception bit data RD is subjected to differential decoding to become demodulated data.

Figure 6:
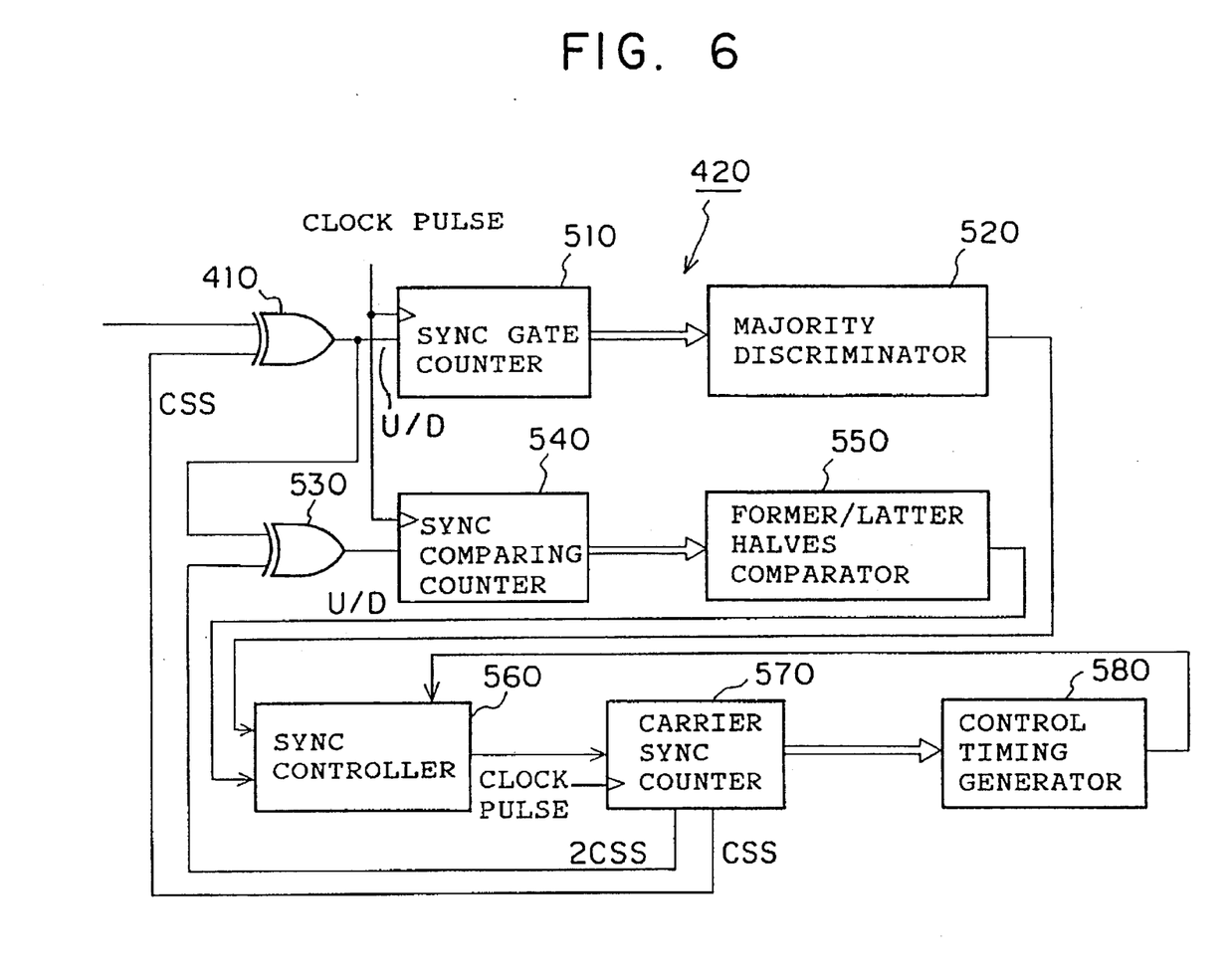
FIG. 6 is a block diagram of the carrier synchronizer shown in FIG. 5.

FIG. 6 shows the arrangement of the carrier synchronizer 420. In this figure, a sync gate counter (SGC) 510 counts up or counts down clock pulses depending on the output signal of an exclusive-OR gate 410. A majority discriminator 520 discriminates as to whether the majority is "0" or "1" in the output of the exclusive-OR gate 410 during a half cycle of the carrier wave based on the count result of the sync gate counter (SGC) 510. An exclusive-OR gate 530 has inputs of the output signal of the exclusive-OR gate 410 and the carrier sync signal 2 CSS having a 2-fold frequency. A sync comparing counter (SCC) 540 is controlled for its count mode (up or down) by the output signal of the exclusive-OR gate 530. Accordingly, it has different count modes for the former half and latter half of a half cycle of the carrier sync signal CSS. A former/latter halves comparator 550 discriminates based on the count result of the sync comparing counter (SCC) 540 during a half cycle of the carrier sync signal as to whether the input signal is in lead-phase or lag-phase relative to the carrier sync signal.

A sync controller 560 produces a signal for correcting the lead-phase or lag-phase of the carrier sync signal based on the comparison result of the former/latter halves comparator 550. A carrier sync counter (SGC) 570 produces the carrier sync signal by advancing the phase of the carrier sync signal when it lags and delaying the phase of the carrier sync signal when it leads based on the output signal of the sync controller 560. A control timing generator 580 times the phase control based on the output of the carrier sync counter (CSC) 570.

Next, the operation of the demodulation circuit will be explained. The exclusive-OR gate 410 receives the BPSK signal and the carrier sync signal CSS provided by the carrier sync counter (CSC) 570, and outputs "0" if both signals are in common phase or "1" if the signals are in opposite phase. The sync gate counter (SGC) 510 counts up or counts down clock pulses if the output of the exclusive-OR gate 410 is "1" or "0", respectively. The count result is delivered to the majority discriminator 520, which discriminates whether the majority is "0" or "1".

The exclusive-OR gate 530 receives the output of the exclusive-OR gate 410 and the signal 2CSS having a frequency twice that of the carrier sync signal CSS, which is used for discriminating the former half and latter half of the CSS signal. Accordingly, the output of the exclusive-OR gate 530 is the output signal of the exclusive-OR gate 410, with its part being inverted for the former or latter half of the carrier sync signal CSS.

In response to this signal, the sync comparing counter (SCC) 540 switches the clock pulse count mode between the former half and latter half of the carrier sync signal CSS. The former/latter halves comparator 550 compares the duration of the pulse between the former half and latter half of a half cycle of the carrier sync signal CSS. The sync controller 560 discriminates the lead-phase or lag-phase of the carrier sync signal CSS based on the results provided by the majority discriminator 520 and former/latter halves comparator 550 at the time of the last count of the carrier sync counter 570, and operates on the carrier sync counter 570 to advance or delay the phase of the carrier sync signal at the count start of the carrier sync counter 570. The control timing generator 580 times the last count and the count start for the next count cycle of the carrier sync counter 570.

Figure 7:
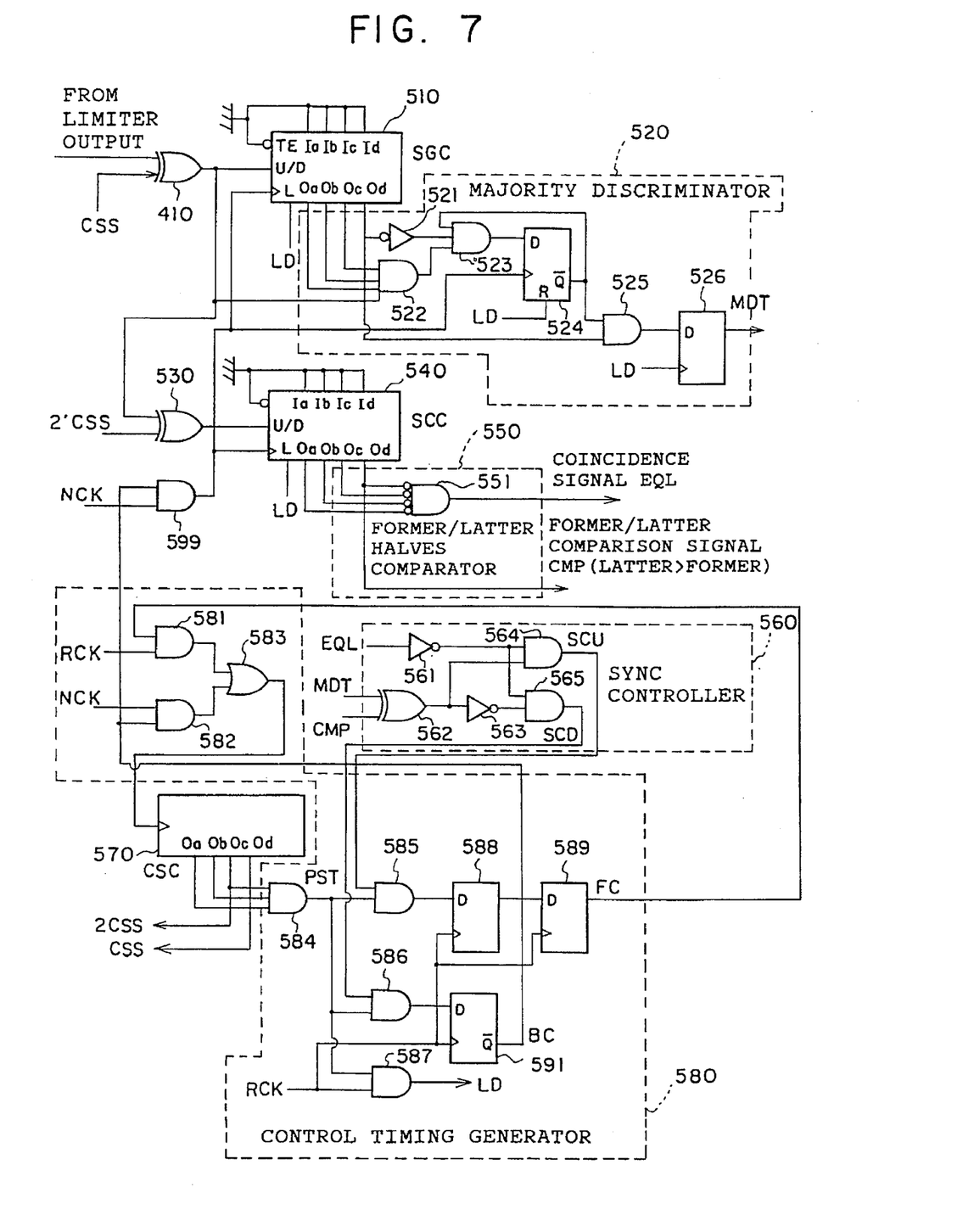
FIG. 7 is a schematic diagram showing a specific circuit arrangement of the carrier synchronizer shown in FIG. 6.

FIG. 7 shows a specific circuit arrangement of the carrier synchronizer 420 shown in FIG. 6. The sync gate counter (SGC) 510 is a sync gate counter consisting of an up/down counter, and the majority discriminator 520 comprises an inverter 521, AND gates 522, 523 and 525, a D-type flip-flop 524 used for the up-count carry latch, and another D-type flip-flop 526 used to latch the output of the AND gate 525. The AND gate 525 produces "0" if the exclusive-OR gate 410 provides "1" longer than "0", or it produces "1" if the gate 410 provides "0" longer than "1". The D-type flip-flop 526 latches the output of the AND gate 525 at the end of a half cycle of the carrier sync signal and retains it until the end of the next half period.

The sync comparing counter (SCC) 540 consists of an up/down counter, and the former/latter halves comparator 550 has a 4-input NOR gate 551. The NOR gate 551 produces a coincidence signal EQL indicative of the coincidence of the former and latter halves of the input signal during a half cycle of the carrier sync signal. The sync comparing counter 540 delivers a former/latter halves comparison signal CMP at its MSB output terminal Od. The sync controller 560 comprises inverters 561 and 563, AND gates 564 and 565, and an exclusive-OR gate 562. The exclusive-OR gate 562 receives the signals MDT and CMP. It outputs "0" if both signals have the same polarity, indicating the lag-phase of the BPSK signal relative to the carrier sync signal, and it outputs "1" if their polarities do not match, indicating the lead-phase. The AND gate 564 produces a sync counter advance signal SCU, while the AND gate 565 produces a sync counter delay signal SCD.

The control timing generator 580 comprises AND gates 581, 582, 584, 585, 586 and 587, an OR gate 583, and D-type flip-flops 588, 589 and 591. The flip-flops 589 and 591 produce a phase advance signal FC and phase delay signal BC for the carrier sync counter (CSC) 570, respectively. The OR gate 583 normally outputs pulses of the clock signal NCK at a constant interval, but it outputs additionally an RCK pulse in response to the phase advance signal FC or it neglects one NCK pulse in response to the phase delay signal BC. Consequently, the carrier sync signal CSS has its phase controlled. The AND gate 584 produces a signal PST indicative of the end of a half cycle of the carrier sync signal CSS, and the AND gate 587 produces a reset timing signal LD. Reference numeral 599 denotes an AND gate.

Figure 8:
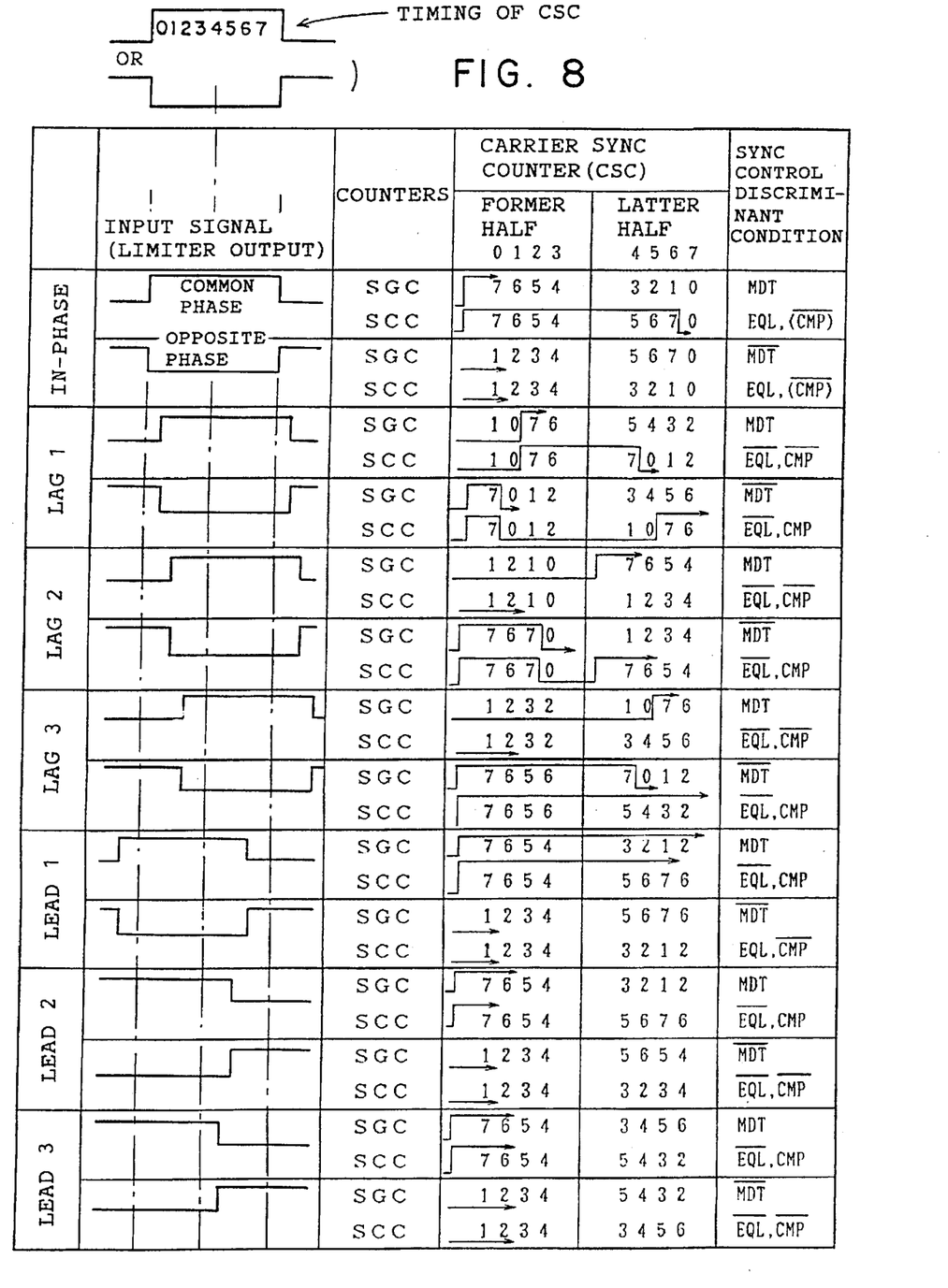
FIG. 8 is a table listing, for the possible cases of the input BPSK signal, the count states of the sync gate counter and sync comparing counter in connection with the operation of the carrier sync counter, and the output signals of the majority discriminator and former/latter halves comparator at the last count "7" of the carrier sync counter as a result of the operation of the carrier synchronizer shown in FIG. 7.

FIG. 8 lists, for the possible cases of the input BPSK signal, the count states of the sync gate counter 570 (SGC) and sync comparing counter 540 (SCC) in connection with the operation of the carrier sync counter 570 (CSC), and the output signals (MDT) of the majority discriminator 520 and the output signals (CMP) of the former/latter halves comparator 550 at the last count "7" of the carrier sync counter 570 (CSC) as a result of the operation of the carrier synchronizer shown in FIG. 7. The input signal is in common phase when MDT="1" and it is in opposite phase when MDT="0", and the signal MDT is delivered intact to the bit synchronizer 450. The input signal is not in lead-phase nor lag-phase when EQL="1", and the phase control does not take place. In the case of EQL="0", if the exclusive logical sum of the signals MDT and CMP is "1", indicating a lagging carrier sync signal CCS relative to the input signal, the carrier sync counter (CSC) 570 is advanced by one pulse, or if it is "0", indicating a leading carrier sync signal CCS, the carrier sync counter (CSC) 570 is delayed by one pulse.

In this manner, the BPSK demodulation and sync phase control are carried out based on the majority discrimination logic, and consequently accurate high-rate data transfer is accomplished.

Embodiment 3

Figure 9:
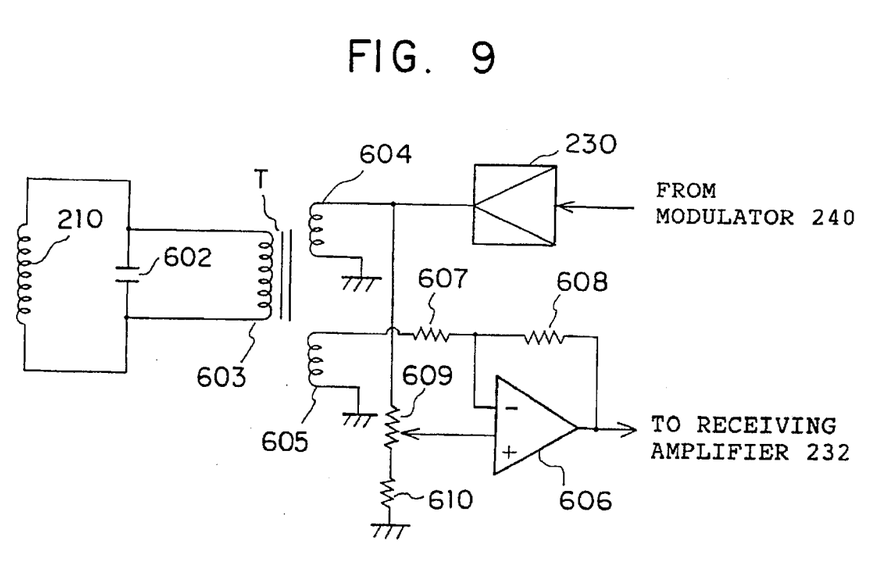
FIG. 9 is a schematic diagram of the antenna coupling circuit based on the third determine of this invention.

FIG. 9 shows the circuit arrangement of the antenna coupling circuit based on the third embodiment of this invention. This circuit is used for the antenna coupling circuit 220 of the previous first embodiment shown in FIG. 1. As shown in this figure, coupling transformer T includes an antenna coil 603, a transmitting coil 604 and a receiving coil 605. The output amplifier 230 has its output connected to the transmitting coil 604 and also connected through a variable resistor 609 and resistor 610 to ground. The receiving coil 605 is connected through a resistor 607 to the inverting input terminal of an operational amplifier 606. The inverting input terminal and output terminal of the operational amplifier 606 are connected by a resistor 608. The non-inverting input terminal of the operational amplifier 606 is connected to the sliding contact of the variable resistor 609.

Next, the operation will be explained. The data signal and the sinusoidal wave signal for power supply from the modulation circuit 240 are fed through the output amplifier 230 to the transmitting coil 604 of the coupling transformer T. These signals are supplied to the antenna coil 603 based on the electromagnetic induction, and then supplied to the loop antenna 210 having a resonance capacitor 602, and radiated as an electromagnetic wave to the space so that it is received by the IC card located in a short distance. The output voltage is divided by the variable resistor 609 and resistor 610 to the voltage equal to the transmitter output induced on the receiving coil 605, and it is fed to the non-inverting input terminal of the operational amplifier 606, thereby offsetting the induced transmission voltage on the receiving coil 605. Consequently, the transmitter output does not affect the received input in the concurrent operations of data transmission and reception.

Figure 10:
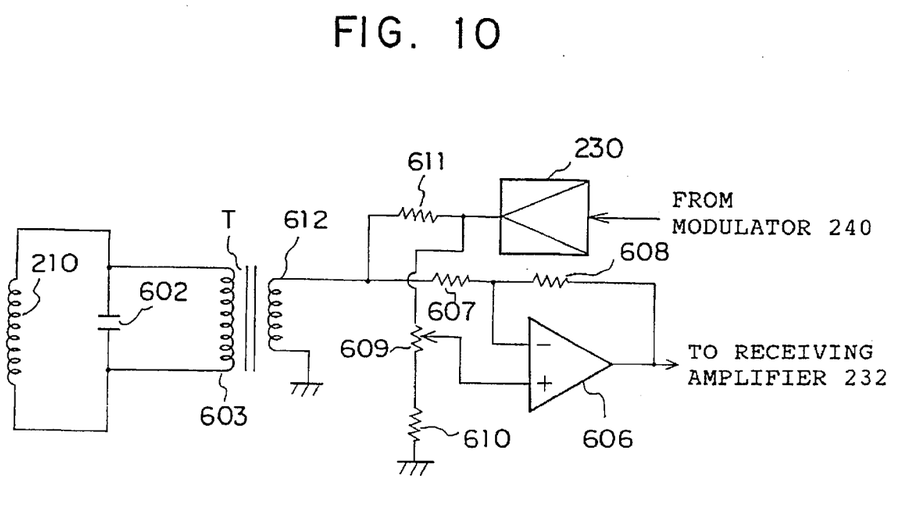
FIG. 10 is a schematic diagram of the antenna coupling circuit which shares one coil for transmission and reception and implements the concurrent transmission and reception.

FIG. 10 shows a modified arrangement of the antenna coupling circuit, which is also capable of performing the concurrent transmission and reception. The coupling transformer T has a transmitting/receiving coil used commonly for the data transmission and reception.

Embodiment 4

Figure 12:
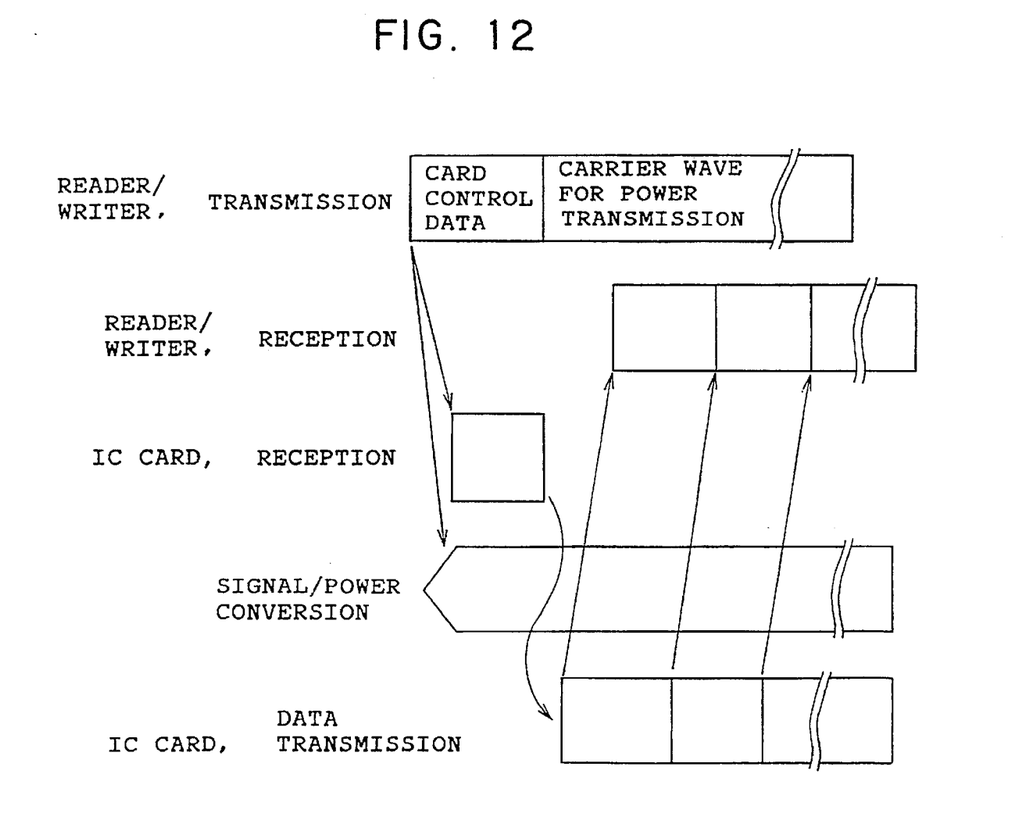
FIG. 12 is a timing chart showing the continuous data transmission/reception of the IC card communication system based on the fourth embodiment of this invention.

FIG. 12 shows the operational timing of the continuous transmission/reception of the IC card communication system based on the fourth embodiment of this invention. The reader/writer 200 transmits data and supplies power to the IC card 100, which has no power source by itself, located in a short distance. The reader/writer 200 transmits serial data in the form of a BPSK-modulated sinusoidal wave signal during the transmission, and it supplies a non-modulated sinusoidal wave signal to the IC card 100 during the reception. The transmission at a certain power level is maintained during the concurrent transmission/reception operation based on the antenna coupling circuit shown in FIG. 9 or FIG. 10 so that power is supplied to the IC card continuously.

Embodiment 5

Figure 11:
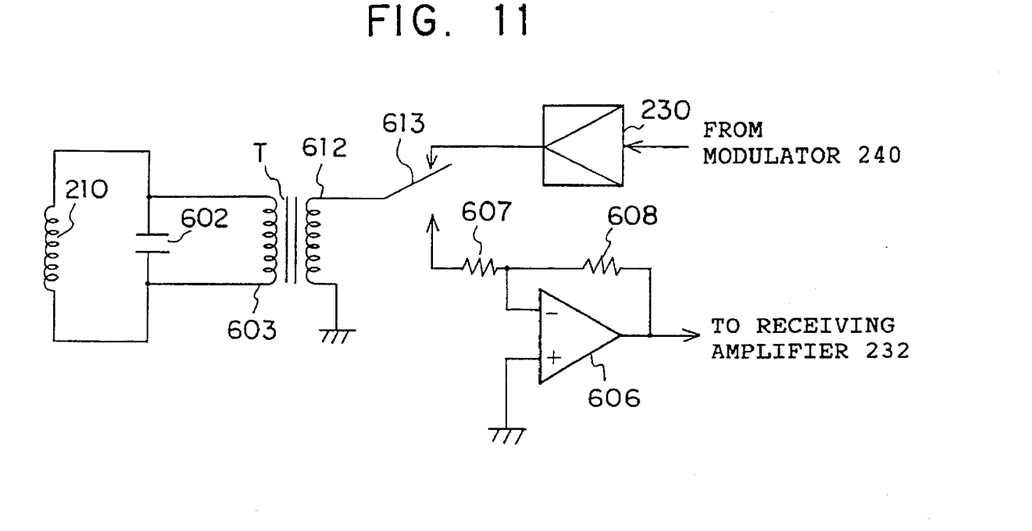
FIG. 11 is a schematic diagram of another antenna coupling circuit used for the intermittent data transmission/reception of the IC card communication system based on the fifth embodiment of this invention.

FIG. 11 shows the circuit arrangement of the antenna coupling circuit used for the intermittent transmission/reception of the IC card communication system based on the fifth embodiment of this invention. As shown in FIG. 11, the coupling transformer T has its transmitting/receiving coil 612 connected by a relay 613 to the output terminal of the output amplifier 230 during the transmission, or to the inverting input terminal of the operational amplifier 606 through a resistor 607 during the reception.

Figure 13:
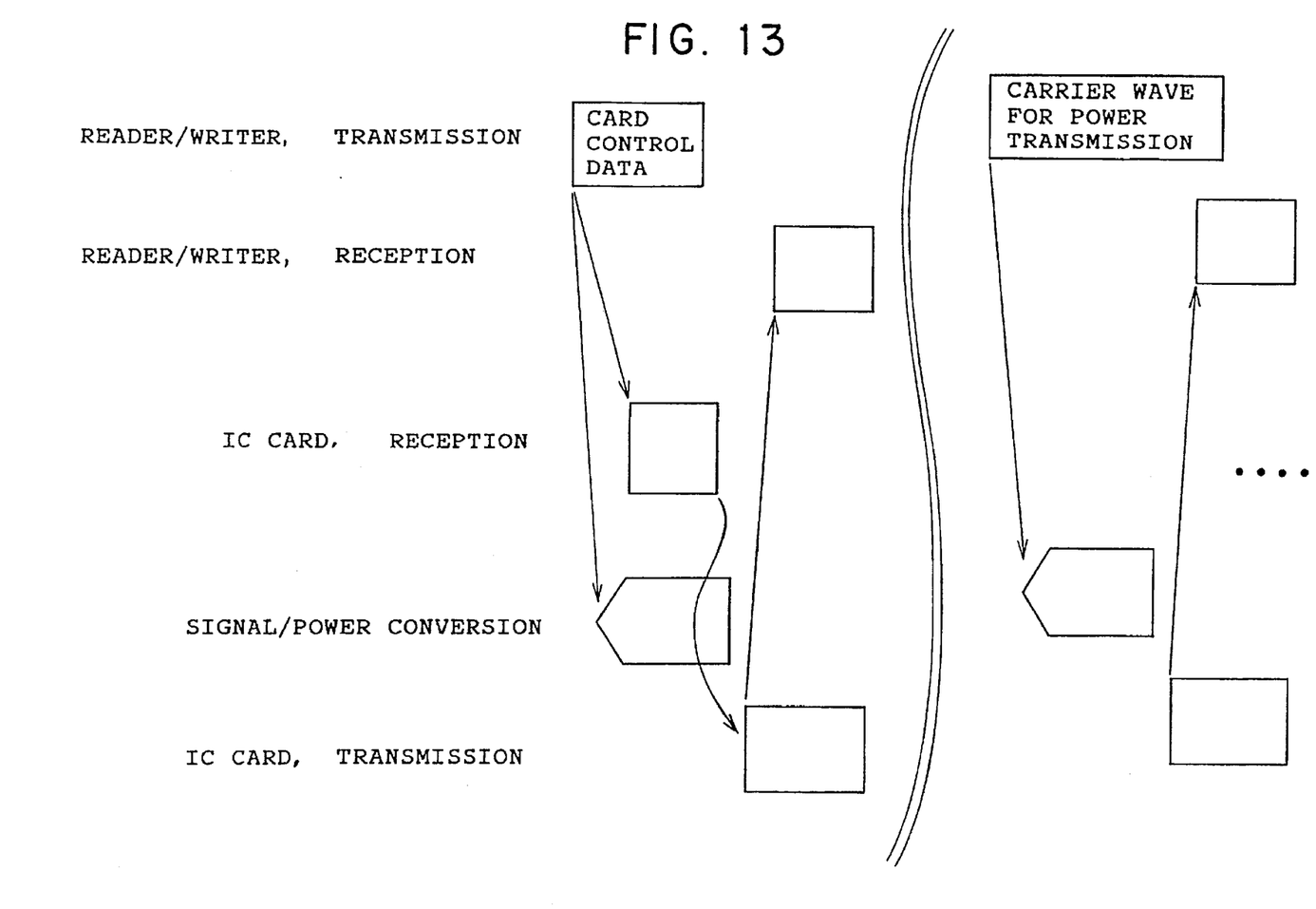
FIG. 13 is a timing chart showing the intermittent transmission/reception between the reader/writer and IC card based on the fifth embodiment of this invention.

FIG. 13 shows the operational timing of the intermittent transmission and reception between the reader/writer 200 and IC card 100. The reader/writer 200 transmits card control data to the IC card 100. The card control data is a BPSK modulated sinusoidal wave signal, which is demodulated and converted into power on the part of the IC card 100. The received power is stored in a capacitor provided in the IC card 100 and used for the data transfer to the reader/writer 200.

In the case of a long term data transfer from the IC card 100 to the reader/writer 200 in excess of the power holding time of the IC card, the reader/writer 200 transmits a non-modulated sinusoidal wave signal intermittently, and the IC card 100 operates based on the power produced from this signal to transfer data intermittently to the reader/writer 200.

What is claimed is:

1. A demodulation circuit having a carrier synchronizer and a bit synchronizer, and used in an IC card reading/writing apparatus, wherein said carrier synchronizer comprises:

a carrier sync signal generation circuit for generating a carrier sync signal;

an exclusive logical sum circuit which receives a signal modulated by binary phase shift keying sent from an IC card and the carrier sync signal provided by said carrier sync signal generation circuit;

a sync gate counter which counts up or count down clock pulses of said reading/writing apparatus depending on the output signal of said exclusive logical sum circuit;

a majority discriminator which determines, while said sync gate counter performs a count operation during a half cycle of the carrier sync signal, the majority level of the signal modulated by binary phase shift keying thereby to detect as to whether the carrier sync signal and the BPSK-modulated signal are in common phase or opposite phase;

a former/latter halves comparator which compares the duration of a pulse of the signal modulated by binary phase shift keying between the former half and latter half of a half period of the carrier sync signal; and a sync control circuit which controls said carrier sync signal generation circuit thereby to control the phase of the carrier sync signal in response to the detection as to whether the carrier sync signal is in lead-phase or lag-phase relative to the signal modulated by binary phase shift keying based on the detection result of said majority discriminator and the comparison result of said former/latter comparator.

2. A demodulation circuit according to claim 1, wherein said bit synchronizer receives the output signal of said majority discriminator in said carrier synchronizer and the carrier sync signal, and delivers demodulated data based on a majority discrimination and delivers a bit-synchronous reception timing signal.

* * * * *